Figure 1:
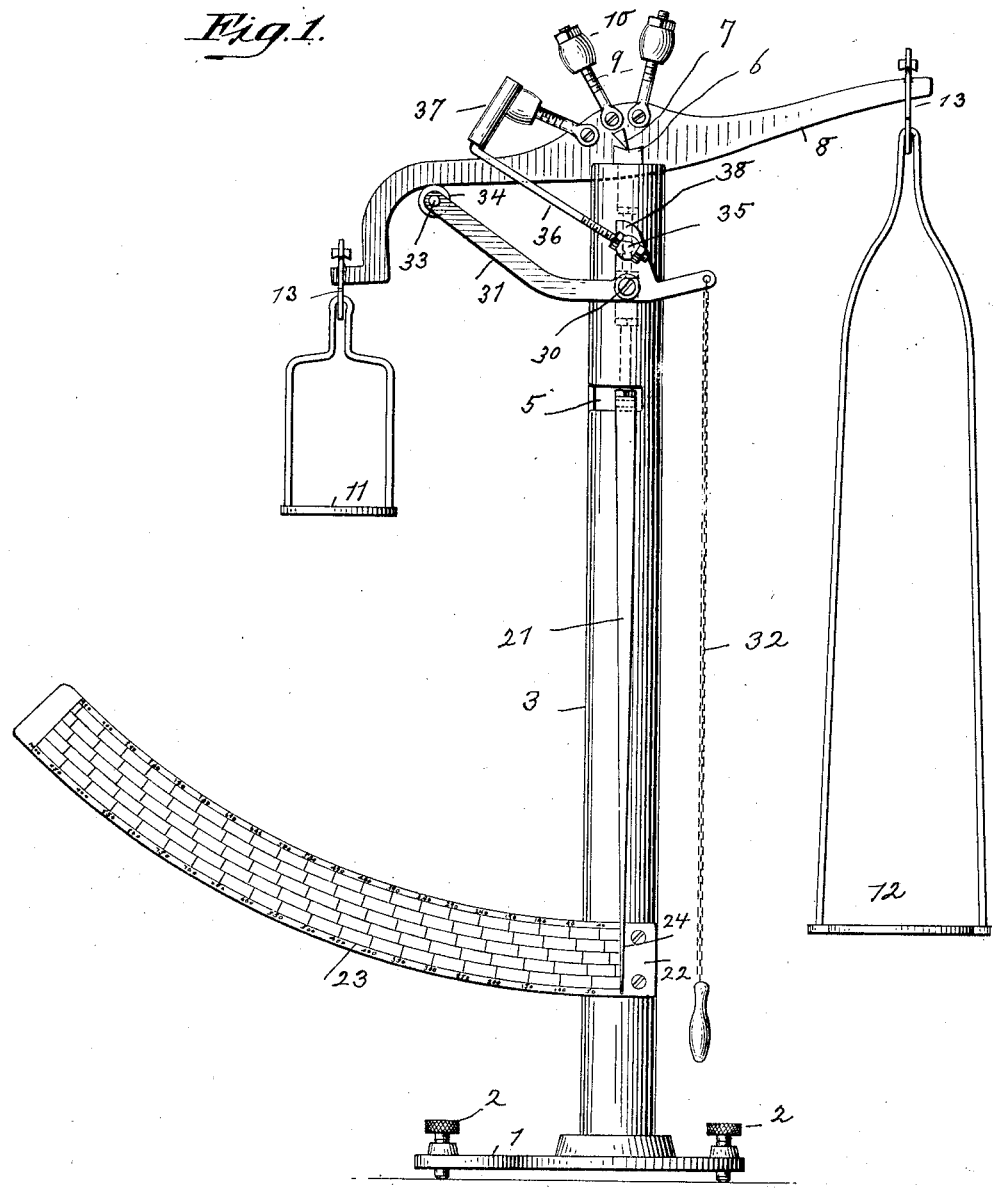

Mar. 6, 1923.

C. SIRCH 1,447,269

PENDULUM SCALE

Filed May 9, 1917    2 sheets-sheet 1

Mar. 6, 1923.
C. SIRCH
PENDULUM SCALE
Filed May 9, 1917 2 sheets-sheet 2
1,447,269
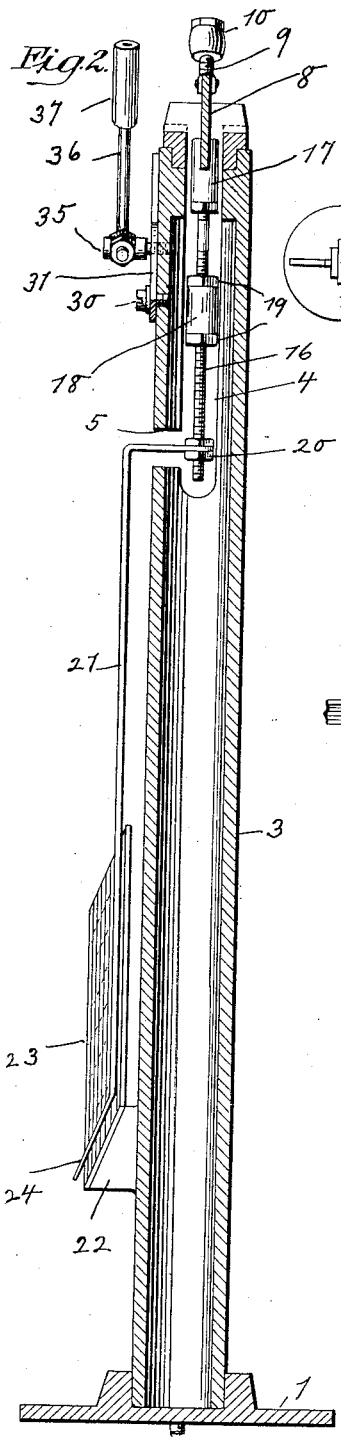
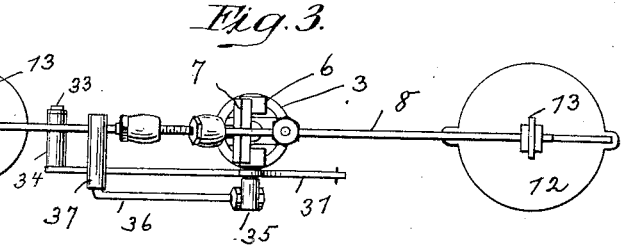
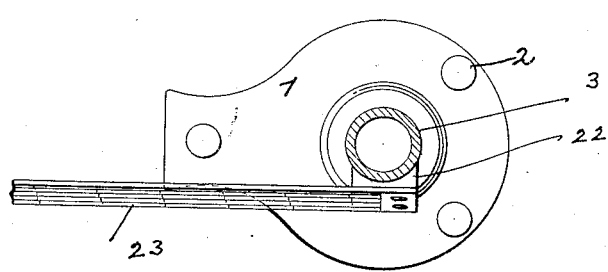
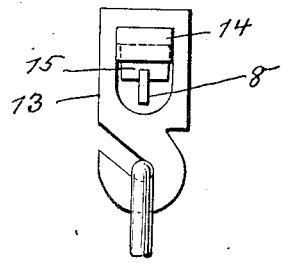
INVENTOR
Charles Sirch
BY
Frank R. Brieser
ATTORNEY Patented Mar. 6, 1923.

1,447,269

UNITED STATES PATENT OFFICE.

CHARLES SIRCH, OF NEW YORK, N. Y.

PENDULUM SCALE.

Application filed May 9, 1917. Serial No. 167,391.

*To all whom it may concern:*

Be it known that I, CHARLES SIRCH, a citizen of the United States, and a resident of New York city, in the county and State of New York, have invented certain new and useful Improvements in Pendulum Scales, of which the following is a specification.

This invention relates to a pendulum scale of novel construction, more particularly adapted for analytical purposes and for weighing off minute quantities such as milligrams. The minute weight units heretofore generally employed in scales of this class, are difficult to handle, are apt to become mislaid, and to suffer in bulk by abrasion. The scale which forms the subject matter of this invention is adapted to weigh off small quantities without the use of any weight units, while for weighing larger quantities, weight units may be employed, so that the larger units only need be handled. The invention comprises the various features of novelty more fully pointed out in the specification and appended claims.
In the accompanying drawing:

Fig. 1 is a front elevation of a pendulum scale embodying my invention;

Fig. 2, a longitudinal section through the post;
Fig. 3, a plan;

Fig. 4, a cross section through the post directly above the index; and

Fig. 5, a detail of one of the hangers.

From the base 1, furnished with leveling screws 2, extends a hollow post 3, which is provided at its upper end with a longitudinal slot 4, that opens into a transverse slot 5. The top of post 3, carries V shaped bearings 6, that are engaged by knife edge fulcrums 7, mounted on the scale beam 8, and extending obliquely to the axis of the latter. From the center of beam 8, project upwardly a number of diverging screw rods 9, that carry threaded ballasting weights 10, by means of which the beam may be set true. From one end of the beam, depends a smaller pan 11 for the reception of weights, while from the other end of the beam, depends a larger pan 12 for the reception of the load or substance to be weighed. Pans 11, 12 are suspended from the beam by means of intervening hangers 13 (Fig. 6) slotted for the reception of the pan-carrying bails, and furnished with upper inverted V shaped bearings 14, engaged by knife edges 15, that project upwardly from beam 8.

From the center of beam 8, there depends into the hollow of post 3, a screw rod 16, that is secured to the beam by means of a slotted coupling 17, and carries an adjustable bob 18, confined between upper and lower nuts 19. To the lower end of screw rod 16, is connected by means of a nut 20, the upper bent end of a pendulum rod 21, which extends outwardly through transverse slot 5, while the main body of the pendulum is exposed and extends in its normal position (i. e. in its position of repose) vertically down along the front of post 3. The parts just described may be so conceived that screw rod 16, constitutes one member of the pendulum, of which rod 21 constitutes the other member, rod 16 during the play of the pendulum, being free to swing out of the hollow of stem 3, through longitudinal slot 4. To the lower end of post 3, is secured by means of an inclined bracket 22, an arched scale or graduated index 23, which extends from the post in a direction coincident with the dip of knife edges 7 (Fig. 1). Over the index, sweeps a pointer 24 which is integral with pendulum rod 21, and is formed by deflecting the lower end of said rod into parallelism with the index. The index may be marked in suitable manner to clearly indicate milligrams or similar small units. With the embodiment shown, it is divided into five concentric belts, each in turn, being subdivided by transverse lines into grades representing say five milligrams, the lines in any one belt, being in stepped relation to those on the adjoining belts. By this arrangement, consecutive weights are represented by successive lines formed in successive belts, so that in this way, the scale may be read with great facility.

With the scale constructed as described, any substance placed into pan 12 will cause the corresponding end of beam 8 to descend, so that knife edges 7 will gradually swing into a vertical position and pointer 24 will travel over index 23 so as to automatically indicate thereon, the weight of the load, the correlation of the parts being such, that the knife edges 7 will assume a vertical position, when the pointer arrives at or about the center of the index. If the entire length of the index represents the sweep of the pointer induced through the weight of one gram, that quantity may be weighed off, without placing any weights into pan 11. If however, larger quantities are to be weighed, weights representing whole grams or similar units are placed into the pan, which must be counterbalanced by the load placed into pan 12, before the pointer will start its travel along index 23 to indicate any desired further fractions. Thus for weighing say 3 grams and 45 milligrams, place a three gram weight into pan 11, and add load to pan 12, until pointer 24 arrives at the 45 mark of index 23.

The scale constructed as described, is so delicate, that its beam is apt to vibrate for quite a length of time before coming to a poise. In order to check these vibrations, and thus save time, there is pivoted to post 3, at 30, a two arm lever 31, from one arm of which is suspended, a hand chain 32. From the other arm of the lever, there extends rearwardly, a pin 33 carrying a rubber or other cushioning sleeve 34, adapted to engage the lower side of beam 8. After a load has been placed on pan 12, a pull on the chain will project the cushioned pin against the beam, and by then slowly relaxing the pull, the pointer may be carried directly to the proper mark on the index, with the elimination of objectionable vibrations.

Means are provided for locking the scale beam against pin 33, when the scale is not in use, thereby preventing the knife edges from becoming unnecessarily worn. To this effect there projects forwardly from post 3, directly above fulcrum 30, a stud 35 to which is pivoted, a hook 36 having a cushioning sleeve 37 and adapted to be so turned by revolving hook 36 in stud 35 as to pass over beam 8, (in which position it is shown in Fig. 3) to hold it against pin 33, thus locking said beam. The downward movement of the lever 31 is limited by the engagement of the stud 35 with a slotted extension 38 of said lever.

I claim:

1. A scale comprising a post, a beam fulcrumed thereto, a pendulum depending from the beam, said pendulum having a lower bent end to constitute an inclined pointer, and an inclined index extending sideways of the post and cooperating with said pointer.

2. A scale comprising a hollow slotted post, a beam fulcrumed thereto, a pendulum having an upper member located within the post, and a lower member located outside of the post, said upper member carrying a bob, and an index cooperating with the lower member.

3. A scale comprising a post, a beam fulcrumed thereto, a pendulum depending from the beam, a lever pivoted to the post, said lever having a slotted extension, a pin carried by the lever and adapted to be projected beneath the beam, a stud on the post, adapted to be engaged by said slotted extension, and a hook pivoted to the stud and adapted to be projected over the beam.

CHARLES SIRCH.